(12) United States Patent
Mozaffari

(10) Patent No.: US 11,449,549 B2
(45) Date of Patent: Sep. 20, 2022

(54) STORING ENTRIES AS ORDERED LINKED LISTS

(71) Applicant: Red Hat, Inc., Raleigh, NC (US)

(72) Inventor: Babak Mozaffari, Santa Monica, CA (US)

(73) Assignee: Red Hat, Inc., Raleigh, NC (US)

( * ) Notice: Subject to any disclaimer, the term of this patent is extended or adjusted under 35 U.S.C. 154(b) by 598 days.

(21) Appl. No.: 14/633,002

(22) Filed: Feb. 26, 2015

(65) Prior Publication Data

US 2016/0253433 A1 Sep. 1, 2016

(51) Int. Cl.
*G06F 16/90* (2019.01)
*G06F 16/22* (2019.01)
*G06F 16/901* (2019.01)

(52) U.S. Cl.
CPC ...... *G06F 16/9024* (2019.01); *G06F 16/2255* (2019.01)

(58) Field of Classification Search
USPC .......................................... 707/744
See application file for complete search history.

(56) References Cited

U.S. PATENT DOCUMENTS

| | | | | |
|---|---|---|---|---|
| 6,728,713 | B1 * | 4/2004 | Beach | G06F 11/1417 |
| 6,889,288 | B2 | 5/2005 | Bono et al. | |
| 7,058,639 | B1 * | 6/2006 | Chatterjee | G06F 17/3033 |
| 7,496,598 | B2 * | 2/2009 | Westendorf | G06Q 10/10 |
| 7,647,344 | B2 * | 1/2010 | Skurtovich, Jr. | G06Q 40/02 |
| | | | | 707/999.107 |
| 8,275,802 | B2 | 9/2012 | Mewhinney et al. | |
| 8,533,398 | B2 | 9/2013 | Anderson et al. | |
| 8,782,441 | B1 | 7/2014 | Osterwalder et al. | |
| 9,069,792 | B1 * | 6/2015 | Craighead | G06F 16/172 |
| 9,081,672 | B1 * | 7/2015 | Nemes | G06F 12/0253 |
| 9,128,940 | B1 * | 9/2015 | Tsaur | G06F 11/1458 |
| 10,318,505 | B2 * | 6/2019 | Baird, III | G06F 16/951 |
| 2004/0133590 | A1 * | 7/2004 | Henderson | G06F 16/2246 |
| | | | | 707/999.102 |
| 2007/0136265 | A1 * | 6/2007 | Hunt | G06F 16/288 |
| 2007/0239769 | A1 * | 10/2007 | Fazal | G06F 16/283 |
| 2010/0010967 | A1 * | 1/2010 | Muller | G06F 17/30587 |
| | | | | 707/E17.014 |
| 2011/0099170 | A1 * | 4/2011 | Golani | G06F 17/30563 |
| | | | | 707/737 |

(Continued)

OTHER PUBLICATIONS

Steve Hatchett, "Exploring C# LinkedLists via LRU Caches (1 of 3)," Bits of SoftWx, Jun. 26, 2012, 3 pages, Internet: <http://blog.softwx.net/2012/06/exploring-linkedlists-via-lru-caches.html>.

(Continued)

*Primary Examiner* — Tamara T Kyle
*Assistant Examiner* — Raheem Hoffler
(74) *Attorney, Agent, or Firm* — Lowenstein Sandler LLP

(57) ABSTRACT

A processor stores a first data item in a first entry of a data structure in association with a first key. The processor stores a second data item in a second entry of the data structure in association with the second key. The processor causes the second entry of the data structure to reference the first entry of the data structure. The processor stores the second key in a third entry of the data structure in association with a business key. The business key is employed to identify a plurality of entries of the data structure comprising the first entry and the second entry.

18 Claims, 4 Drawing Sheets

| Entry | Key | Value | Chain Key |
|---|---|---|---|
| 0 | Business_Key | | Chain_Key_A |
| 1 | Chain_Key_A | INFORMATION_A | Chain_Key_B |
| 2 | Chain_Key_B | INFORMATION_B | Chain_Key_C |
| 3 | Chain_Key_C | INFORMATION_C | Chain_Key_n |
| ... | | ... | |
| n | Chain_Key_n | INFORMATION_n | none |

(56) References Cited

U.S. PATENT DOCUMENTS

| | | | | |
|---|---|---|---|---|
| 2011/0264687 A1* | 10/2011 | Surtani | ............... | G06F 16/9014 |
| | | | | 707/769 |
| 2012/0023077 A1* | 1/2012 | Kann | ................ | G06F 17/30581 |
| | | | | 707/702 |
| 2012/0117076 A1* | 5/2012 | Austermann | ..... | G06F 17/30542 |
| | | | | 707/741 |
| 2012/0158729 A1* | 6/2012 | Mital | .................... | H04L 49/101 |
| | | | | 707/738 |
| 2012/0265776 A1 | 10/2012 | Wang et al. | | |
| 2013/0173853 A1 | 7/2013 | Ungureanu et al. | | |
| 2013/0346415 A1* | 12/2013 | Tomlinson | ............... | G06F 16/22 |
| | | | | 707/741 |
| 2014/0012885 A1* | 1/2014 | Mack | ................. | G06F 16/2228 |
| | | | | 707/803 |
| 2014/0304525 A1* | 10/2014 | Novak | ................. | G06F 3/0659 |
| | | | | 713/193 |
| 2015/0081367 A1* | 3/2015 | Westlake | ......... | G06Q 10/06311 |
| | | | | 705/7.15 |
| 2015/0261776 A1* | 9/2015 | Attarde | ............. | G06F 17/30156 |
| | | | | 707/664 |
| 2017/0039143 A1* | 2/2017 | Ritchie | ............... | G06F 16/2255 |

OTHER PUBLICATIONS

No Author, "Implement LRU Cache," Geeks for Geeks, [retrieved Nov. 18, 2014], 18 pages, Internet: <http://www.geeksforgeeks.org/implement-lru-cache/>.

No Author, "LRU Cache in Java with Generics and O(1) Operations," Stack Overflow, [Retrieved Nov. 18, 2014], 2 pages, Internet: http://stackoverflow.com/questions/23772102/lru-cache-in-java-with-generics-and-o1-operations.

Mark Grand et al., "Visual Basic Design Patterns," Structural Patterns, Jul. 29, 2005, pp. 277-278, Chapter 6, John Wiley & Sons.

\* cited by examiner

| Entry | Key | Value | Chain Key |
|---|---|---|---|
| 0 | Business_Key | | Chain_Key_A |
| 1 | Chain_Key_A | INFORMATION_A | Chain_Key_B |
| 2 | Chain_Key_B | INFORMATION_B | Chain_Key_C |
| 3 | Chain_Key_C | INFORMATION_C | Chain_Key_n |
| ... | ... | | |
| n | Chain_Key_n | INFORMATION_n | none |

STORING ENTRIES AS ORDERED LINKED LISTS

TECHNICAL FIELD

The present disclosure relates to an information storage system, and more particularly, to storing information in such a key-based data structure as ordered linked lists to take advantage of these features.

BACKGROUND

Modern technological advancements have provided people with greater access to information than ever before. Many people have electronic devices such as desktop computers, laptops, smartphones or tablets that they use to access the vast amount of information available on the Internet. Some of these people may desire to use their electronic device to find information about various objects.

DESCRIPTION OF DRAWINGS

The details of one or more embodiments are set forth in the accompanying drawings and the description below. Other features and advantages will be apparent from the description and drawings, and from the claims.

FIG. 2 illustrates an example key-based data structure, in accordance with some embodiments.

DETAILED DESCRIPTION

Figure 1:
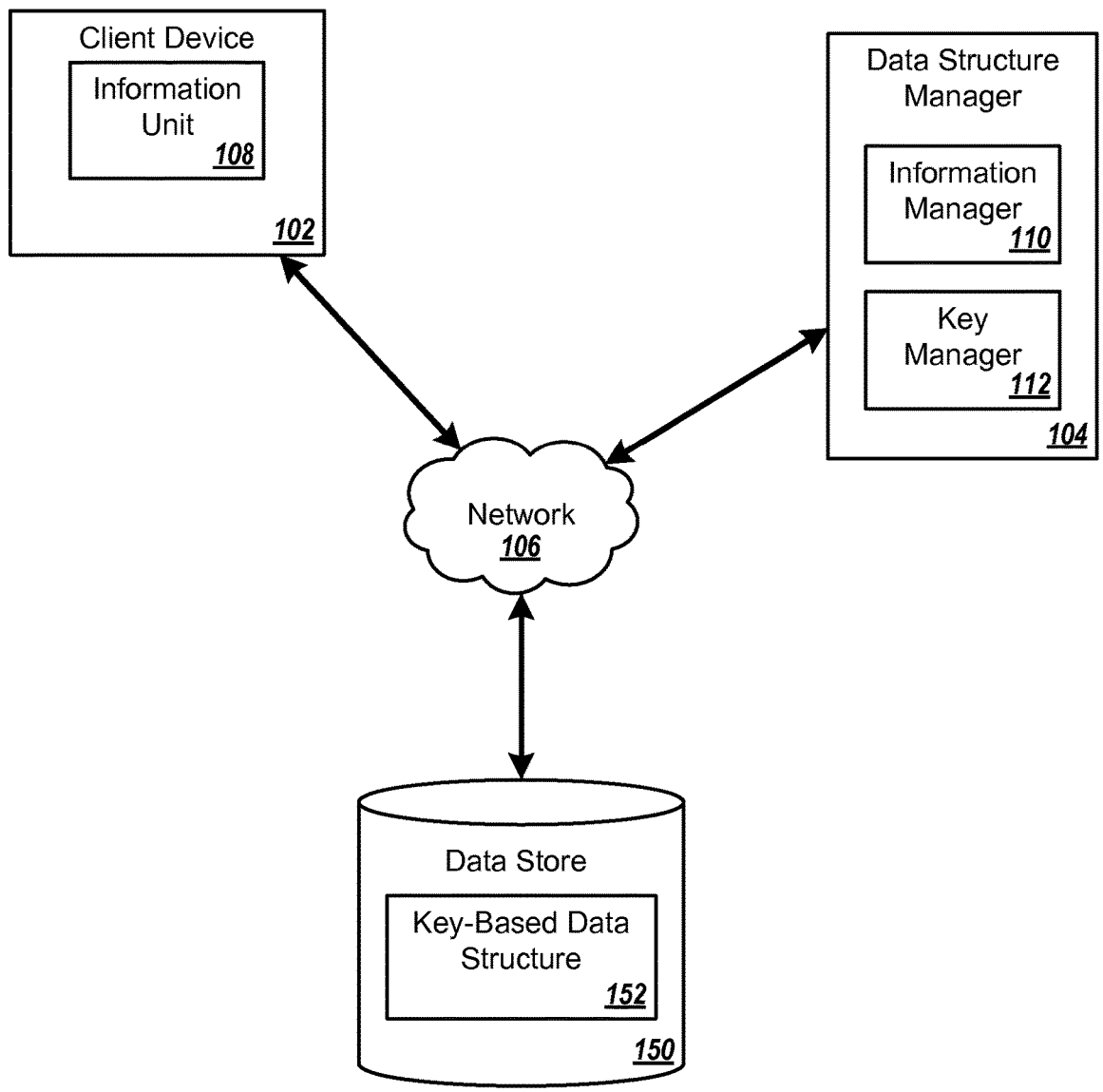
FIG. 1 is an example system architecture, in accordance with one embodiment.

Described herein are techniques for storing information pertaining an object in a key-based data structure and retrieving the information using a business key. Information about an object may comprise multiple data items (e.g., several attributes of a certain object). In conventional systems, all information for the object may be stored in a single entry in a key-based data structure, thus making inefficient access operations with respect to a certain information elements. For example, the information may have a certain data expiration policy requiring to delete a data item upon expiration of a certain time period since the data element creation or last update operation. As an example, information about gasoline prices for a gas station (object) may change frequently, such as on an hourly basis. Storing reports of gasoline prices in a single entry, for example, may not be efficient since the information is frequently updated, the most recent price is often required, and the least recent price may need to be removed from the data structure entry due to the data expiration policy. Other conventional approaches may store various information for the object in separate entries in the key-based data structure. Under such approaches, information may be evicted in piecemeal leaving some of the information in the key-based data structure after other information has been evicted. Retrieving such information from the key-based data structure, however, is problematic because all entries concern the same object and should be retrievable using a single business key, rather than the multiple keys that are required under the multiple-entry data storage scheme Aspects of the present disclosure address these and other shortcomings of conventional systems by providing a system and method for storing information pertaining an object in a key-based data structure and retrieving the information using a business key. In accordance with one or more aspects of the present disclosure, two or more data items associated with the same business key value may be stored individually in multiple entries of the data structure, while effectively forming a linked list, e.g., formed in reverse chronological order of the data expiration time.

In an illustrative example, the least recently created or modified data item may be stored in a first data structure entry associated with an arbitrary (e.g., randomly generated) key. The next-least recent data item may then be stored in a second data structure entry associated with another arbitrary assigned key, and the second data structure entry would reference the key to the data structure entry holding the previously stored data item. This pattern may continue, storing all data items in a linked list, in which each data item reference a least recently updated one, until the end of the linked list is reached. After storing the most recently created or updated data item, its key may be saved as a separate data structure entry associated with a "business key" identifying the plurality of entries. The business key may be communicated to the requesting clients for subsequently performing data retrieval operations.

In this illustrative example, a data item may expire a certain time after the record creation/update. The expiration policy may be automatically enforced by removing the expired data item from the end of the linked list.

Inserting a new data item may involve determining the business key, looking up the business key in the data structure to identify the previous most recent object, storing the key of that data item in a newly created data structure entry along with the new data item in association with a randomly generated key, and storing the newly generated key as the updated value to the business key.

FIG. 1 illustrates an example system architecture 100, in accordance with one embodiment of the disclosure, for storing information in a key-based data structure as ordered linked lists and retrieving the information using a key. The system architecture 100 includes at least one client device 102 coupled to a data structure manager 104 via a network 106. The system architecture 100 also includes a data store 150. In one embodiment, the network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 150 may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

The client device 102 may include any type of computing device such as a personal computer (PCs), laptop, mobile phone, smart phone, tablet computer, netbook computer, etc. In some embodiments, the client device 102 may also be referred to as a user device. The client device 102 includes an information unit 108, which may include a software application that receives information about an object. In some embodiments, the information unit 108 receives the information about the object from a user, such as via a graphical user interface (GUI). In these embodiments, the user can enter information about the object, such as a location, drop a pin on a map within the GUI, additional details about the object, or the like. For example, the user can identify a gasoline station (the object) and can provide information (e.g., location, prices) about the gas station to the information unit 108. The received information of the object can be stored on a local storage device on the client device 102. The client device 102 can send the information to the data structure manager 104, where the data structure manager can store the information in a key-based data structure 152 in data store 150. The system 100 can include any number of client devices 102. Each client device 102 may send information of the object to the data structure manager 104. Moreover, each client device 102 may send a request for all information associated with the object to the data structure manager 104, as described herein.

The data structure manager 104 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to store information of an object in a key-based data structure 152 and facilitate the retrieval of the information of the object from the key-based data structure 152 to the client device 102. The data structure manager 104 may include an information manager 110 and a key manager 112, as described herein.

The data store 150 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. The data store 150 can include one or more key-based data structures 152. The key-based data structure 152 can include multiple entries for information and each entry can be associated with a different key. The key-based data structure 152 can store information in a key-based chain, where each entry also includes a key for a subsequent entry. For example, the key-based data structure 152 can store information in three entries A, B, C. Information stored in entry A can be returned using a business key. Entry A also includes a chain key that corresponds to entry B that is returned with the information stored in entry A. Similarly, information and a chain key that corresponds to entry C can be stored in entry B. The chain keys can be arbitrary (e.g., randomly generated). The key-based data structure 152 is further described in conjunction with FIG. 2.

In operation of system architecture 100, the information manager 110 of the data structure manager 104 can receive information of an object from any source. In some embodiments, the information manager 110 receives crowd-sourced information of the object one or more multiple client devices 102. In some embodiments, the information manager 110 receives information of the object from an authorized representative of the object. For example, an owner or manager of a gasoline station may periodically send information about the gasoline station (e.g., daily gasoline prices) to the information manager 110.

When the information manager 110 receives information about an object, the key manager 112 can determine a key for the information and store the information in the key-based data structure 152 in association with the determined key. For example, the information manager 110 receives a first data item of the object. The key manager 112 stores the first data item in the key-based data structure 152 in association with a business key. The business key can be randomly generated or can be derived from the object attributes, such as by concatenated geographical coordinates of the object. In either case, the business key may be known by the querying clients or be derived from the object itself. When the information manager 110 receives additional information of the object, the key manager 112 determines a chain key for the previously received data item, removes the association between the business key and the first data item and stores the new data item and the chain key in the key-based data structure 152 in association with the business key.

The client device 102 can also generate a request for information pertaining to the object. For example, a user of the client device 102 may desire to receive a history of gasoline prices (information) for a gas station (object). The request can include an identifier of the object, which may be the business key. The client device 102 can send the request and the business key to the data structure manager 104. The information manager 110 of the data structure manager 104 receives the request and uses the business key to retrieve the first data item of the object and a chain key from the key-based data structure 152. The information manager 110 then uses the chain key to retrieve second data item of the object. In some embodiments, a second chain key is stored in association with the data item information. In such embodiments, the information manager 110 can use the second chain key to retrieve third information from the key-based data structure 152. The information manager 110 can continue to retrieve information from the key-based data structure 152 until it stops receiving a chain key. The information manager 110 can send all information for the object that was retrieved from the key-based data structure 152 to the client device 102.

FIG. 2 illustrates an example key-based data structure 200, in accordance with some embodiments. In some embodiments, the key-based data structure is a hash table may be referred to as a data structure used to implement an associative array, a structure that can map keys to values. A hash table uses a hash function to compute an index into an array of buckets or slots, from which the correct value can be found.

The key-based data structure 200 may include a set of keys 202 and their corresponding values 204 and a chain key 206 stored in an entry 208 in the key-based data structure 200. The data stored in the key-based data structure 200 can be a chain of related information. For example, the key-based data structure 200 can store a daily history of gasoline process for a gasoline station, where each day is stored as a separate entry 208 in the key-based data structure 200. The chain keys 206 can be used to link the entries 208 to each other under the business key. As illustrated, entry 0 stores a "Chain_Key_A" in association with a Business Key. Entry 1 is a first entry in a chain of information. Entry 1 has a key that corresponds to a "Chain_Key_A," as described herein. Information ("INFORMATION_A") 204 and a chain key 206 (Chain_Key_B) is stored in entry 1. When an information manager (e.g., the information manager 110 of FIG. 1) provides the "Business Key" to the key-based data structure 200, the chain key for the most recent object (e.g., Chain_Key_A) is returned. The information manager can provide the Chain_Key_A to the key-based data structure 200 and the value ("INFORMATION_A") and the chain key (Chain_Key_B) are returned. The information manager can then use the Chain_Key_B to retrieve the next information in the chain, which is "INFORMATION_B" stored in entry 2. The information manager also received the next chain key, which is "Chain_Key_C." In a similar manner, the information manager can retrieve "INFORMATION_C" and "Chain_Key_n" from the key-based data structure 200. The information manager can continue to retrieve information in the chain until it receives information without a corresponding chain key, as illustrated in entry n. The information retrieved from the key-based data structure 200 can then be sent to an entity that requested the data (e.g., the client device 102 of FIG. 1).

In some embodiments, to populate the key-based data structure 200 with information, the information manager receives the first data item (e.g., information_C) and stores it in entry 1 in association with a chain key (e.g., Chain_Key_A). The information manager can store the first chain key (e.g., Chain_Key_A) in association with the business key. When the information manager receives the data item information (e.g., information_B), the information manager disassociates the first chain key from the business key. The information manager associates the second chain key with the business key. In this manner, a chain key for the most recent information is stored in association with the business key.

When the information manager receives third information (e.g., information_A), the information manager disassociates the second chain key from the business key. The information manager associates a third chain key with the business key. In this example, the first data item (e.g., information_C) is retrieved from the key-based data structure 200 using the chain_key_C. The second data item (e.g., information_B) is retrieved from the key-based data structure 200 using the chain_key_B. The third information (e.g., information_A) is retrieved from the key-based data structure 200 using the chain_key_A. The chain_key_A is retrieved from the key-based data structure 200 using the business key. The last entry in the key-based data structure 200 is retrieved using its respective "chain_key_n." In some embodiments, no chain key is stored in the last entry of the chain.

Figure 3:
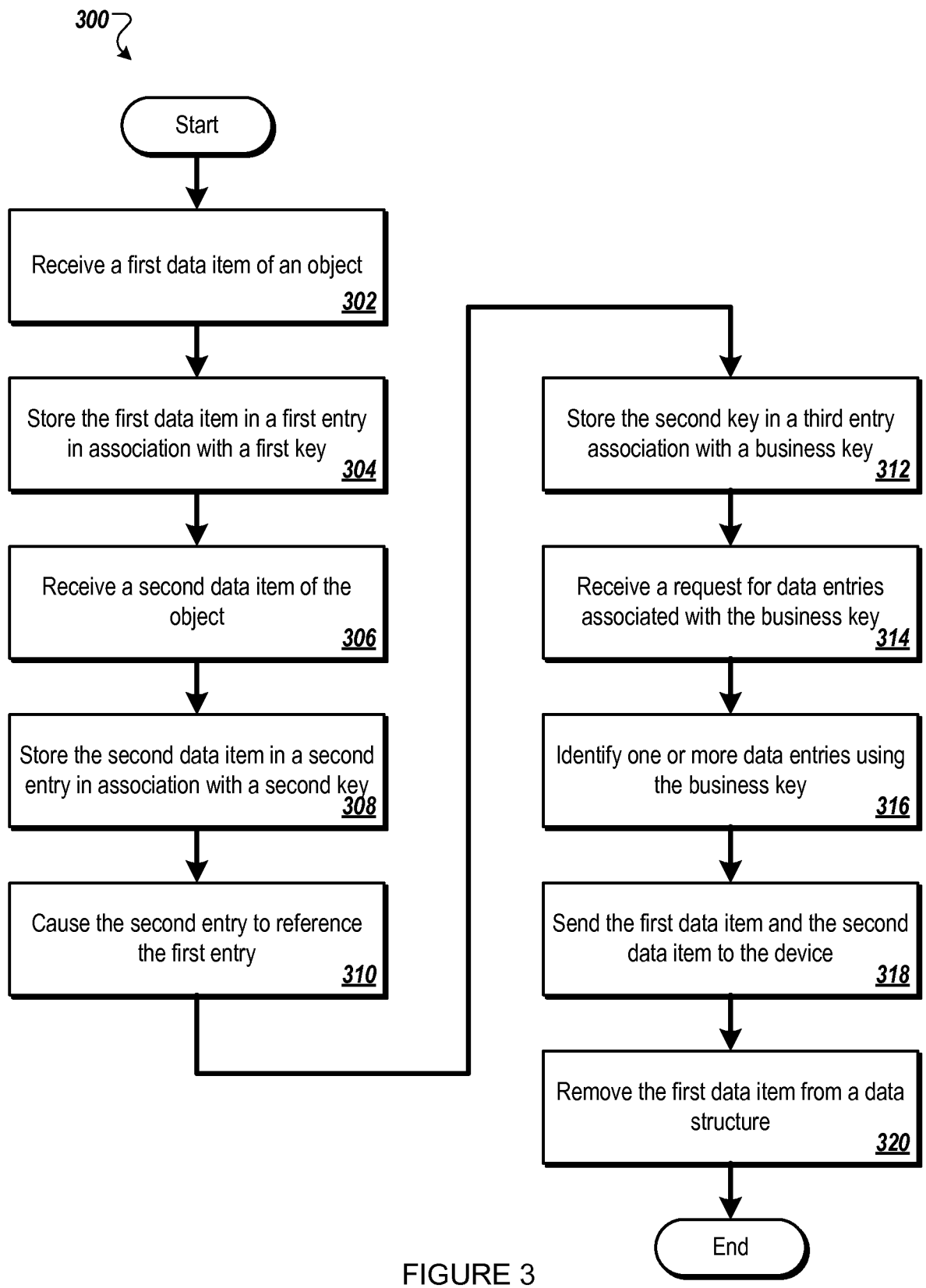
FIG. 3 is a flow diagram of a method for storing information in a key-based data structure as ordered linked lists and retrieving the information using a key in accordance with some embodiments.

FIG. 3 is a flow diagram of a method 300 for identifying a set of objects that are geographically proximate to a numerical location in accordance with some embodiments. Method 300 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In some embodiments, method 300 is performed primarily by an data structure manager 104 of FIG. 1. For clarity of presentation, the description that follows uses the system 100 as examples for describing the method 300. However, another system, or combination of systems, may be used to perform the method 300.

Referring to FIG. 3, in one embodiment, method 300 begins at block 302 when the processing logic receives a first data item that is related to an object. For example, the processing logic can receive the first data item (gasoline price(s)) for an object (gasoline station). The processing logic can receive the first data item from any source, such as a client device, or from an authorized person of the gasoline station.

At block 304, the processing logic stores the first data item in a first entry in a key-based data structure in association with a first key. The business key can be, for example, geographic coordinates of the object. Alternatively, the business key can be a randomly generated value that is associated with the object. In some embodiments, storing the first entry includes randomly generating the first key.

At block 306, the processing logic receives a second data item of the object, which can be from any source, including the same or different source that sent the first data item of the object. At block 308, the processing logic stores the second data item in a second entry of the data structure in association with the second key. In some embodiments, storing the second entry includes randomly generating the second key. At block 310, the processing logic causes the second entry of the data structure to reference the first entry of the data structure. At block 312, the processing logic stores the second key in a third entry of the data structure in association with a business key. The business key is employed to identify a plurality of entries of the data structure comprising the first entry and the second entry.

At block 314, the processing logic receives a request for data entries associated with a specified business key value, such as from a user device. For example, the request can be for gasoline prices for a gasoline station. The request can include the business key.

At block 316, the processing logic identifies one or more data entries associated with a chain of data entries associated with the specified business key value. For example, the processing logic identifies the first data item and the second data item from the key-based data structure. The processing logic can use the business key to retrieve a first chain key. The processing logic can use the first chain key to retrieve the first data item and the second chain key. The processing logic can use the second chain key to retrieve the second data item from the key-based data structure.

At block 318, the processing logic sends the first data item and second data item to the device that requested all data item in the key-based data structure that is associated with the object.

At block 320, the processing logic removes the first data item from the data structure. In some embodiments, the processing logic evicts the first data item from the key-based data structure after an event. In some embodiments, the event is a predetermined threshold of time. In some embodiments, the event is an addition of further information to the key-based data structure. The processing logic can also remove, from the second entry, a reference to the first entry.

Figure 4:
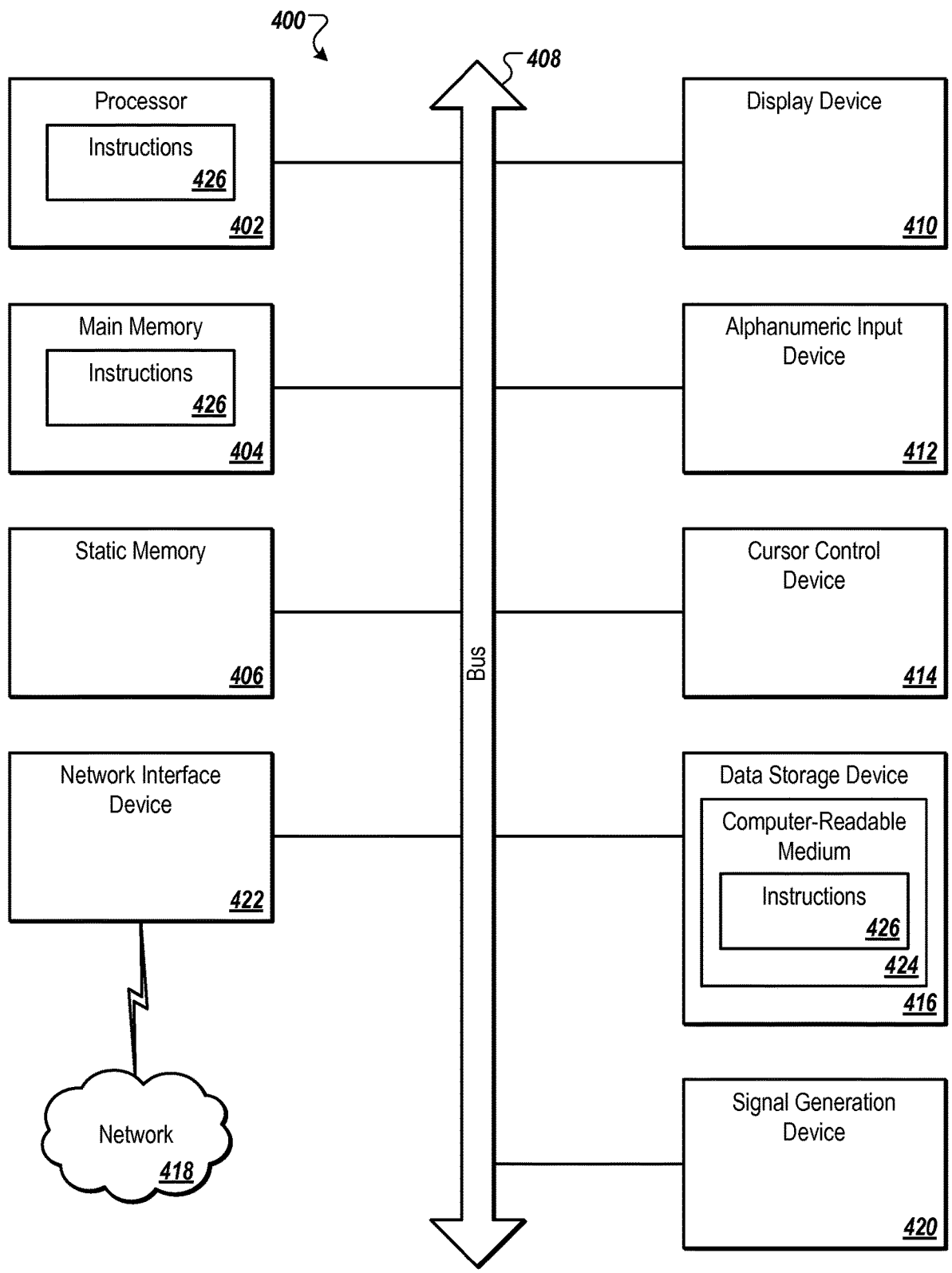
FIG. 4 illustrates an example machine of a computer system within which a set of instructions, for causing the machine to perform any one or more of the methodologies discussed herein, may be executed.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the network node for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the network node embodying any one or more of the methodologies or functions described herein. The sets of instructions 426 of the network node may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

What is claimed is:

1. A method comprising:
   storing a first data item, pertaining to an object, in a first entry of a data structure in association with a first key, wherein the data structure is provided by a hash table;
   storing a second data item, pertaining to the object, in a second entry of the data structure in association with a second key;
   causing the second entry of the data structure to store, in the hash table, a first chain key that is equal to the first key of the first entry of the data structure, wherein a chain of data entries stores data entries in reverse chronological order of a data expiration time associated with each of the data entries of the chain of data entries;
   storing a business key, corresponding to the object, in a third entry of the data structure, the business key being utilized for data retrieval operations associated with the object and being different from the first key and the second key;
   causing the third entry of the data structure to store, in the hash table, a second chain key that is equal to the second key;
   receiving, from a client device, a request for data entries associated with the object, wherein the request comprises the business key; and
   responsive to receiving the request, retrieving the second chain key from the third entry using the business key, retrieving the second data item and the first chain key from the second entry using the second chain key, retrieving the first data item using the first chain key, and transmitting the first data item and the second data item to the client device.

2. The method of claim 1, further comprising:
   storing a third data item, pertaining to the object, in a fourth entry of the data structure in association with a third key, wherein the chain of data entries stores data entries in the reverse chronological order of the data expiration time associated with each of the data entries of the chain of data entries;

causing the fourth entry of the data structure to store a third chain key that is equal to the second key; and updating the third entry of the data structure to store a fourth chain key that is equal to the third key in association with the business key.

3. The method of claim 1, wherein storing the first entry comprises randomly generating the first key.

4. The method of claim 1, wherein storing the second entry comprises randomly generating the second key.

5. The method of claim 1, wherein the first data item is a least recently created or updated data item.

6. The method of claim 1, further comprising:

removing the first entry from the data structure in view of an amount of time associated with the first entry exceeding a threshold; and in response to removing the first entry from the data structure, removing, from the second entry, a reference to the first chain key that is equal to the first key of the first entry, wherein removing the reference causes the business key to no longer identify the first entry as part of the chain of data entries.

7. The method of claim 6, wherein removing the first entry from the data structure in view of the amount of time associated with the first entry exceeding the threshold further comprises:

determining a time the first entry was generated; and determining that the amount of time elapsed between the time the first entry was generated and a current time exceeds the threshold.

8. The method of claim 6, wherein removing the first entry from the data structure in view of the amount of time associated with the first entry exceeding the threshold further comprises:

determining a time the first entry was modified; and determining that the amount of time elapsed between the time the first entry was modified and a current time exceeds the threshold.

9. A system comprising:

a memory; and a processor operatively coupled to the memory, the processor to:

store a first data item, pertaining to an object, in a first entry of a data structure in association with a first key, wherein the data structure is provided by a hash table;

store a second data item, pertaining to the object, in a second entry of the data structure in association with a second key;

cause the second entry of the data structure to store, in the hash table, a first chain key that is equal to the first key of the first entry of the data structure, wherein a chain of data entries stores data entries in reverse chronological order of a data expiration time associated with each of the data entries of the chain of data entries;

store a business key, corresponding to the object, in a third entry of the data structure, the business key being utilized for data retrieval operations associated with the object and being different from the first key and the second key;

cause the third entry of the data structure to store, in the hash table, a second chain key that is equal to the second key receive, from a client device, a request for data entries associated with the object, wherein the request comprises the business key; and responsive to receiving the request, retrieve the second chain key from the third entry using the business key, retrieve the second data item and the first chain key from the second entry using the second chain key, retrieve the first data item using the first chain key, and transmit the first data item and the second data item to the client device.

10. The system of claim 9, the processor further to:

store a third data item, pertaining to the object, in a fourth entry of the data structure in association with a third key, wherein the chain of data entries stores data entries in the reverse chronological order of the data expiration time associated with each of the data entries of the chain of data entries;

cause the fourth entry of the data structure to store a third chain key that is equal to the second key; and update the third entry of the data structure to store a fourth chain key that is equal to the third key in association with the business key.

11. The system of claim 9, the processor further to:

remove the first entry from the data structure in view of an amount of time associated with the first entry exceeding a threshold; and in response to removing the first entry from the data structure, remove, from the second entry, a reference to the first chain key that is equal to the first key of the first entry, wherein removing the reference causes the business key to no longer identify the first entry as part of the chain of data entries.

12. The system of claim 9, wherein storing the first entry comprises randomly generating the first key.

13. A non-transitory computer readable storage medium that comprises instructions that, when executed by a processor, cause the processor to:

store a first data item, pertaining to an object, in a first entry of a data structure in association with a first key, wherein the data structure is provided by a hash table;

store a second data item, pertaining to the object, in a second entry of the data structure in association with a second key;

cause the second entry of the data structure to store, in the hash table, a first chain key that is equal to the first key of the first entry of the data structure, wherein a chain of data entries stores data entries in reverse chronological order of a data expiration time associated with each of the data entries of the chain of data entries;

store a business key, corresponding to the object, in a third entry of the data structure, the business key being utilized for data retrieval operations associated with the object and being different from the first key and the second key;

cause the third entry of the data structure to store, in the hash table, a second chain key that is equal to the second key receive, from a client device, a request for data entries associated with the object, wherein the request comprises the business key; and responsive to receiving the request, retrieve the second chain key from the third entry using the business key, retrieve the second data item and the first chain key from the second entry using the second chain key, retrieve the first data item using the first chain key, and transmit the first data item and the second data item to the client device.

14. The non-transitory computer readable storage medium of claim 13, the instructions to cause the processor further to:

store a third data item, pertaining to the object, in a fourth entry of the data structure in association with a third key, wherein the chain of data entries stores data entries in the reverse chronological order of the data expiration time associated with each of the data entries of the chain of data entries;

cause the fourth entry of the data structure to store a third chain key that is equal to the second key; and update the third entry of the data structure to store a fourth chain key that is equal to the third key in association with the business key.

15. The non-transitory computer readable storage medium of claim 13, wherein storing the first entry comprises randomly generating the first key.

16. The non-transitory computer readable storage medium of claim 13, wherein storing the second entry comprises randomly generating the second key.

17. The non-transitory computer readable storage medium of claim 13, the instructions to cause the processor further to:

remove the first entry from the data structure in view of an amount of time associated with the first entry exceeding a threshold; and in response to removing the first entry from the data structure, remove, from the second entry, a reference to the first chain key that is equal to the first key of the first entry, wherein removing the reference causes the business key to no longer identify the first entry as part of the chain of data entries.

18. The non-transitory computer readable storage medium of claim 13, wherein the first data item is a least recently created or updated data item.

* * * * *